United States Patent
Robison et al.

(10) Patent No.: US 10,148,436 B2
(45) Date of Patent: Dec. 4, 2018

(54) FINGERPRINT REVOCATION

(71) Applicant: Dell Products, L.P., Round Rock, TX (US)

(72) Inventors: Charles D. Robison, Buford, GA (US); Frank H. Molsberry, Georgetown, TX (US); Daniel L. Hamlin, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 235 days.

(21) Appl. No.: 15/185,232

(22) Filed: Jun. 17, 2016

(65) Prior Publication Data

US 2017/0366345 A1 Dec. 21, 2017

(51) Int. Cl.
*H04L 9/08* (2006.01)
*H04L 29/06* (2006.01)

(52) U.S. Cl.
CPC .......... *H04L 9/0891* (2013.01); *H04L 9/0866* (2013.01); *H04L 63/068* (2013.01); *H04L 63/0861* (2013.01)

(58) Field of Classification Search
CPC .............. H04L 9/0891; H04L 63/0853; H04L 63/0428; H04L 63/0861; H04L 63/08; H04L 2209/127; H04L 41/082; H04L 67/125; G06F 21/32; G06F 21/78; G06F 21/62; G06F 21/70; G06F 11/1415; G06F 2221/0771; G06F 2221/2141; G06Q 20/3829
See application file for complete search history.

(56) References Cited

U.S. PATENT DOCUMENTS

2009/0031013 A1* 1/2009 Kunchipudi .......... G06F 9/4416
709/222
2015/0319171 A1 11/2015 Robison et al.
(Continued)

OTHER PUBLICATIONS

Berger (2009). Safely adding smart cards and other security monitoring devices to enterprise networks. Retrieved Mar. 31, 2018 from http://www.smartcard.co.uk/members/newsletters/2009/SCN%20September%202009.pdf.*

(Continued)

*Primary Examiner* — Brian F Shaw
(74) *Attorney, Agent, or Firm* — Fogarty LLP (57) ABSTRACT

Systems and methods for fingerprint revocation are described. In some embodiments, an Information Handling System (IHS) may include: a processor; and a memory coupled to the processor, the memory having program instructions stored thereon that, upon execution, cause the IHS to: identify an endpoint device; and transmit a key management command to the endpoint device over a network, where the endpoint device includes a host processing system and an off-host processing system segregated from the host processing system, where the off-host processing system includes an off-host processor and an off-host memory coupled to the off-host processor, where the off-host memory includes Personal Identifiable Information (PII) encrypted with a master key, and where the off-host processor is configured to change a status of the master key in response to having received the key management command.

20 Claims, 3 Drawing Sheets

(56) References Cited

U.S. PATENT DOCUMENTS

2016/0105283 A1* 4/2016 Mityagin .............. H04L 9/0891
  380/279
2016/0127327 A1* 5/2016 Mehta ................. H04L 63/0428
  713/168

OTHER PUBLICATIONS

ControlVault (2008). Dell ControlVault: Locking down your users' credentials. Retrieved Mar. 31, 2018 from http://www.dell.com/downloads/global/products/latit/en/dell_controlvault_specsheet.pdf.*

Broadcom Corporation, "BCM5880 Cryptographic Module Security Policy, Document Version 1.1", Revision Date: Feb. 2, 2010, 28 Pages.

* cited by examiner

FINGERPRINT REVOCATION

FIELD

This disclosure relates generally to Information Handling Systems (IHSs), and more specifically, to systems and methods for fingerprint revocation.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In some cases, an IHS or some feature thereof may be protected using biometric verification. Generally speaking, biometric verification involves techniques by which a user can be uniquely identified by evaluating one or more of the user's distinguishing biological traits. A record of a user's unique characteristic (e.g., fingerprint, iris, etc.) is captured and kept in the IHS's memory as a reference template.

Later on, when identification verification is required (e.g., when the user wants to log into the IHS, change a configuration setting, etc.), a new template is captured and compared with the reference template. If the newly captured template matches the reference template, the user's identity is confirmed. And, if the user's identity is confirmed, the user is granted access to the IHS or to a subset of its features.

SUMMARY

Embodiments of systems and methods for distributed authorization are described herein. In an illustrative, non-limiting embodiment, an Information Handling System (IHS) may include a processor and a memory coupled to the processor, the memory having program instructions stored thereon that, upon execution, cause the IHS to: identify an endpoint device; and transmit a key management command to the endpoint device over a network, where the endpoint device includes a host processing system and an off-host processing system segregated from the host processing system, where the off-host processing system includes an off-host processor and an off-host memory coupled to the off-host processor, where the off-host memory includes Personal Identifiable Information (PII) encrypted with a master key, and where the off-host processor is configured to change a status of the master key in response to having received the key management command.

In various embodiments, identifying the endpoint device may include receiving an indication, from the endpoint device, that the endpoint device is connected to the network. The key management command may include a revocation command, and the off-host processor may be configured to delete or invalidate the master key in response to having received the revocation command. The master key may have an expiration, the key management command may include a renewal command, and the off-host processor may be configured to reset the expiration in response to having received the renewal command.

In some cases, the PII may include at least one of: username and password, fingerprint data, facial scan data, iris scan data, voice sample data, smartcard data, magnetic card data, or near-field communication (NFC) data. The key revocation command may be transmitted to the endpoint device through an out-of-band channel bypassing the host processing system. The off-host processor may have access to a secondary network controller segregated from a primary network controller coupled to the host processor.

The endpoint device may include an embedded controller coupled to the off-host processing system, the PII may be encrypted with a first key and with the master key prior to being stored in the off-host memory, the first key may be derivable by the embedded controller, and the master key may not be derivable by the embedded controller.

In another illustrative, non-limiting embodiment, an off-host processing system may be coupled to an IHS such that the off-host processing system is segregated from a host processing system, the off-host processing system having an off-host processor and an off-host memory, the off-host memory having program instructions stored thereon that, upon execution by the off-host processor, cause the off-host processor to: store a master key in the off-host memory; receive fingerprint information from a user; encrypt the fingerprint information with the master key; store the encrypted fingerprint information in the off-host memory; receive a key management command over a network; and change a status of the master key in response to the command.

In some cases, receiving the key management command may occur in response to transmitting an indication, to an authentication server, that the IHS is connected to the network. The key management command may include a revocation command, and the off-host processor may be configured to delete or invalidate the master key in response to having received the revocation command. The master key may have an expiration, the key management command may include a renewal command, and the off-host processor may be configured to reset the expiration in response to having received the renewal command.

The key revocation command may be received by the IHS through an out-of-band channel bypassing the host processing system. The off-host processor may have access to a secondary network controller segregated from a primary network controller coupled to the host processor. The IHS may further include an embedded controller coupled to the off-host processing system, where the fingerprint information is encrypted with a first key and with the master key prior to being stored in the off-host memory, where the first key is derivable by the embedded controller, and where the master key is not derivable by the embedded controller.

In yet another illustrative, non-limiting embodiment, in an Information Handling System (IHS) having an off-host processing system, the off-host processing system segregated from a host processing system, the off-host processing system having an off-host processor and an off-host memory, a method may be performed by the off-host processor, the method comprising: receiving a key management command over a network; and changing a status of the master key in response to the command, where the master key is stored in the off-host memory, and where the master key is used by the off-host processor to encrypt fingerprint information stored in the off-host memory.

The key management command may include a revocation command, and the off-host processor may be configured to delete or invalidate the master key in response to having received the revocation command. The master key may have an expiration, the key management command may include a renewal command, and the off-host processor may be configured to reset the expiration in response to having received the renewal command. The key revocation command may be received by the off-host processor through a secondary network controller segregated from a primary network controller coupled to the host processor. The IHS may further include an embedded controller coupled to the off-host processing system, where the fingerprint information is encrypted with a first key and with the master key prior to being stored in the off-host memory, where the first key is derivable by the embedded controller, and where the master key is not derivable by the embedded controller.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Systems and methods described herein may provide fingerprint revocation. In various embodiments, a local biometric reference template or any other sensitive data, such as Personal Identifiable Information (PII) sits at rest encrypted with symmetric key, referred to as a "master key," that is issued by a systems administrator inside an out-of-band and/or always available hardware or cryptographic software secured storage container. The system administrator can revoke the master key in the event that the biometric template is compromised through detecting tampering through software or physically. The user is reissued a new master key and re-enrolls. During login or Next-Generation Data Security (NGDS) data loading, as examples, the candidate template is captured, send to the secure processor. The reference is decrypted with the master key, if still present, and compared to the candidate template in the secure processor. During provisioning, the device ID and user ID are sent to a remote authentication server and a master key is returned to the device secure container (e.g., over a Transport Layer Security or TLS connection). If devices are compromised, template information can no longer be used.

In some embodiments, each user may be issued a master key, which is a unique symmetric encryption key, from the remote authentication server to encrypt local securely stored biometric and PII data. In some cases, the master key can be trusted to be destroyed due to container's high availability, out of band, single developer ownership and post process immunities. As such, techniques described herein may secure against multiple users on single device, rogue employees after termination, mass biometric data leakage, and lost device PII leaks. Moreover biometric and PII are secure for migration and/or roaming.

For purposes of this disclosure, an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
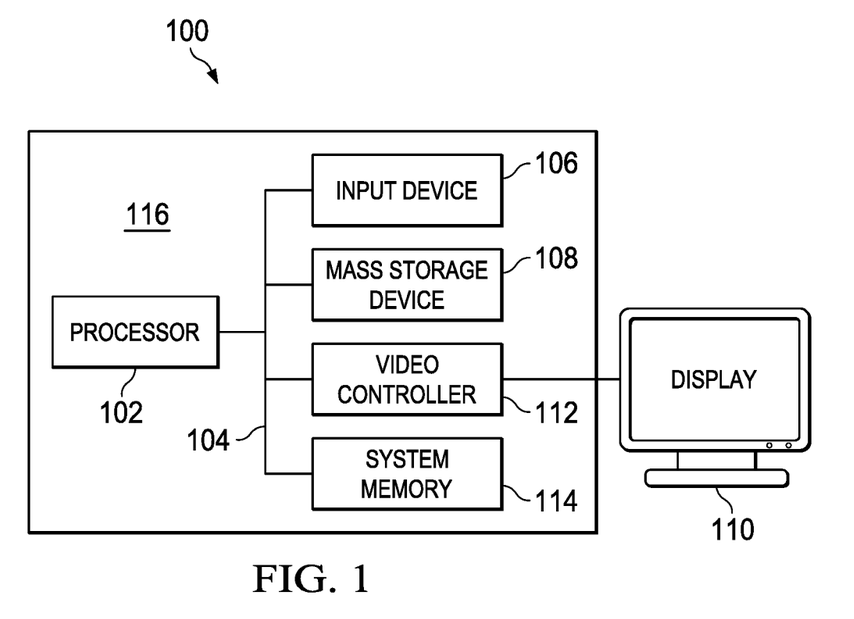
FIG. 1 is a schematic view illustrating an example of an Information Handling System (IHS) according to some embodiments.

FIG. 1 is a schematic view illustrating an example of an IHS according to some embodiments. As shown, IHS 100 includes processor 102, which is connected to bus 104. Bus 104 serves as a connection between processor 102 and other components of IHS 100. Input device 106 is coupled to processor 102 to provide input to processor 102. Examples of input devices may include keyboards, touchscreens, pointing devices such as mice, trackballs, and trackpads, and/or a variety of other such devices. Programs and data are stored on mass storage device 108, which is coupled to processor 102. Examples of mass storage devices may include hard discs, optical disks, magneto-optical discs, solid-state storage devices, and/or a variety other mass storage devices.

IHS 100 further includes display 110, which is coupled to processor 102 by video controller 112. System memory 114 is coupled to processor 102 to provide processor 102 with fast storage to facilitate execution of computer programs. Examples of system memory may include random access memory (RAM) devices such as dynamic RAM (DRAM), synchronous DRAM (SDRAM), solid state memory devices, and/or a variety of other memory devices.

In an embodiment, chassis 116 houses some or all of the components of IHS 100. It should be understood that other buses and intermediate circuits may be deployed between the components described above and processor 102 to facilitate interconnection between those components and processor 102.

Figure 2:
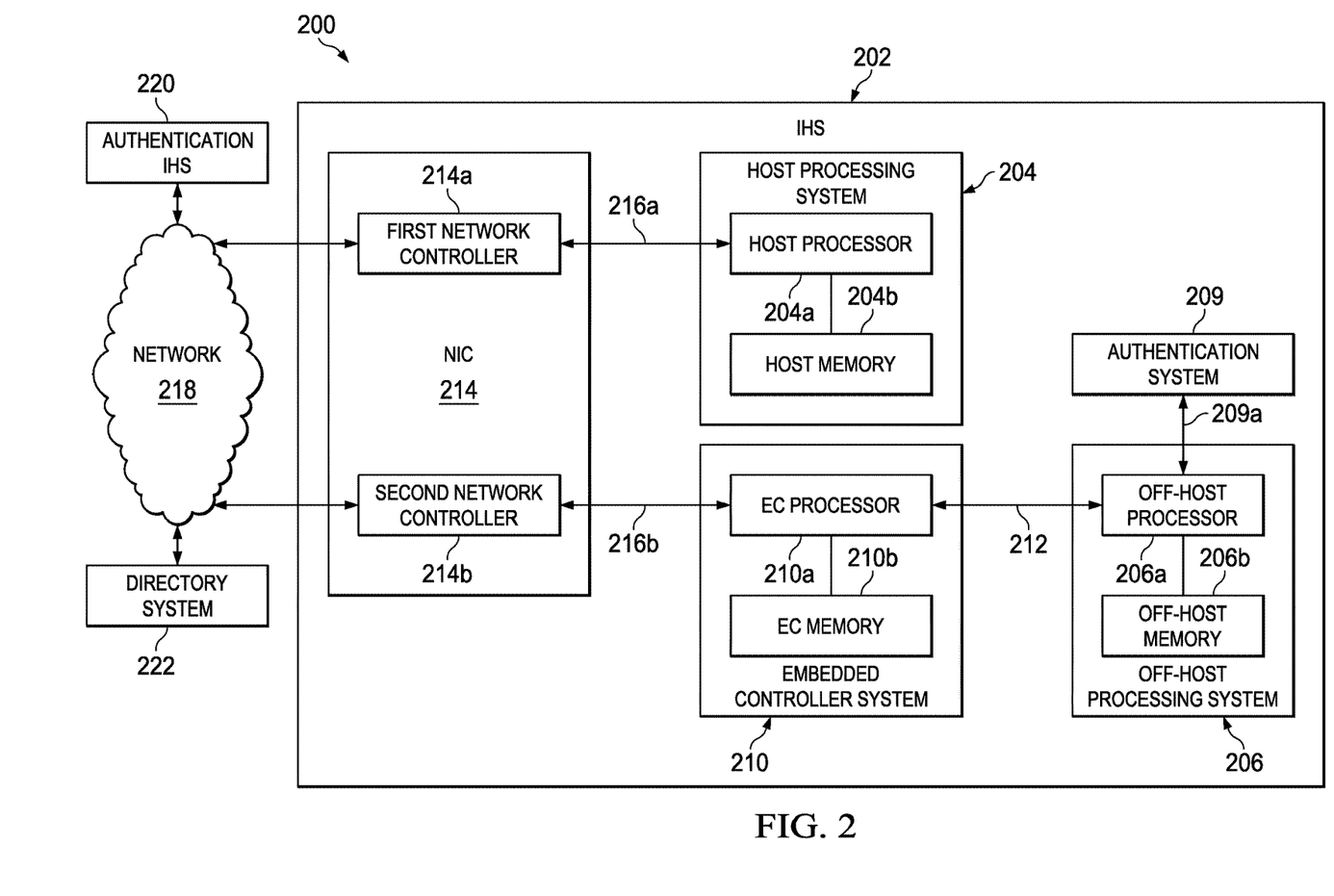
FIG. 2 is a schematic view illustrating an example of an environment where an off-host authentication processing system may be used according to some embodiments.

Referring now to FIG. 2, an embodiment of environment 200 where off-host authentication processing system 206 may be used is illustrated. Environment 200 includes IHS 202, which may be IHS 100 and/or may include some or all of the components of IHS 100. For example, IHS 100 may be a server IHS, a desktop IHS, a laptop/notebook IHS, a tablet IHS, a mobile phone IHS, and/or a variety of other IHSs. IHS 202 comprises host processing system 204, which in turn comprises host processor 204a, host memory 204b, and/or other components.

For example, host processor 204a of host processing system 204 may include processor 102, whereas host memory 204b may include system memory 114. More generally, host processing system 204 may include a variety of processing systems utilized by IHS 202 to perform processing operations related to, for example, executing an Operating System (OS) and/or other software applications.

IHS 202 also comprises embedded controller system 210 that includes embedded controller processor 210a, embedded controller memory 210b, and/or other embedded controller components. For example, embedded controller processor 210a in embedded controller system 210 may include a processor, and embedded controller memory 210b in embedded controller system 210 may include a memory device having instructions that, when executed by embedded controller processor 210a, cause embedded controller processor 210a to perform operations discussed further below.

In the illustrated embodiment, embedded controller processor 210a is coupled to off-host processor 206a via bus 212 such as, for example, a Low-Pin Count (LPC) connection. However, bus 212 may be any variety of physical/logical bus connections that support encrypted communications, including but not limited to, an LPC connection, a USE, a Thunderbolt interface, an I²C, an SPI, a PCI, and/or other bus connections.

IHS 202 also includes network interface controller 214 that provides first network controller 214a, second network controller 214b, and/or other network interface controller components. In some embodiments, network interface controller 214 is compliant with INTEL CORPORATION's Active Management Technology (AMT) and/or "vPro" technology. In an embodiment, first network controller 214a in network interface controller 214 may be segregated, distinct from, and/or otherwise separate from second network controller 214b by assigning to the first network controller 214a a first Media Access Control (MAC) address that is different from a second MAC address that is assigned to the second network controller 214b. In another embodiment, first network controller 214a and second network controller 214b may be segregated from each other in another manner such as, for example, by providing first network controller 214a on a different network interface controller than second network controller 214b.

Host processor 204a of host processing system 204 is coupled to first network controller 214a in network interface controller 214 via bus 216a, and embedded controller processor 210a in embedded controller system 210 is coupled to second network controller 214b in network interface controller 214 via bus 216b. In some embodiments, buses 216a and 216b may be part of the same bus such as, for example, an I²C connection that couples host processing system 204 and embedded controller system 210 to network interface controller 214. However, bus 214 may be any variety of physical/logical bus connections that support encrypted communications, including but not limited to, I²C, USB, Thunderbolt, SPI, PCI, and/or other bus connections.

Host processor 204a may be configured to only have access to the first network controller 214a by providing host processor 204a a first MAC address that is assigned to first network controller 214a, while embedded controller processor 210a may be configured to only have access to second network controller 214b by providing embedded controller processor 210a a second MAC address that is assigned to second network controller 214b. However, as discussed above, first network controller 214a and second network controller 214b may be provided on different network interface controllers such that buses 216a and 216b are physically separate buses.

IHS 202 is coupled to off-host authentication processing system 206 that includes off-host processor 206a, off-host memory 206b, and/or other off-host processing components. In some cases, off-host authentication processing system 206 may be physically disposed outside of chassis 116—that is, off-host authentication processing system 206 is not a part of IHS 202; and it only coupled to it via bus 212. As used herein, the term "off-host" refers to external off-host authentication processing system 206 being distinct from host processing system 204.

Particularly, off-host processor 206a within off-host authentication processing system 206 may include a secure processor that is segregated, distinct from, and/or otherwise separate from processor 102 in IHS 202, and off-host memory 206b within external off-host authentication processing system 206 may include a memory device that is segregated, distinct from, and/or otherwise separate from system memory 114 in IHS 202 such that off-host memory 206b is accessible by off-host processor 206a but not by host processor 204a. In an example, off-host authentication processing system 206 may be provided, at least in part, using a CONTROLVAULT system that is available from DELL, INC.

Authentication system or device 209 may include, for example, an input device such as a keyboard, a fingerprint reader device or other biometric data reader device, a smart card reader device, an radio frequency identification (RFID) or Near Field Communication (NFC) device that is configured to wirelessly connect to a mobile user device (e.g., a mobile phone), and/or a variety of other authentication devices. Authentication device 209 may be coupled to off-host processor 206 in off-host authentication processing system 206 via USB or Smart Card Interface (SCI) bus 209a. However, bus 209a may be any variety of physical/logical bus connections including but not limited to, USB, SCI, Thunderbolt, I²C, SPI, PCI, and/or other bus connections.

Each of first network controller 214a and second network controller 214b is coupled to network 218 such as, for example, a local area network (LAN), the Internet, and/or a variety of other networks.

Authentication IHS 220 is coupled to network 218. In an embodiment, authentication IHS 220 may be implemented as IHS 100 discussed above with reference to FIG. 1 and/or may include some or all of the components of IHS 100. For example, authentication IHS 220 may be a server IHS or authentication server that may operates to verify user authentication credential inputs and/or verify authentication tokens. In an embodiment, authentication IHS 220 is associated with at least one authentication IHS private key and at least one authentication IHS public key. The at least one authentication IHS private key and the at least one authentication IHS public key may be stored in storage device that is accessible by authentication IHS 220.

In an embodiment, IHS 202 is associated with at least one user IHS private key and at least one user IHS public key. The at least one user IHS private key and the at least one user IHS public key may be stored in storage device that is accessible by off-host authentication processing system 206. For example, the at least one user IHS private key and the at least one user IHS public key may be stored on off-host memory 206b, on host memory 204b, and/or in a variety of other user IHS storage locations. Furthermore, the at least one user IHS public key may be shared with other systems such as, for example, authentication IHS 220.

Directory system 222 is also coupled to network 218. In an embodiment, directory system 222 may include an active directory service available from MICROSOFT CORPORATION. For example, directory system 222 may include an active directory service that is provided on a server IHS and that operates to authenticate and authorize users, assign and enforce security policies, install and update software, and/or perform a variety of other directory system operations.

In an embodiment, network 218, authentication IHS 220, and directory system 222 may be controlled by the same entity. For example, a business or government may provide, house, or otherwise maintain control of each of network 218, authentication NS 220, and directory system 222 in order to provide an increased level of security using environment 200.

In some embodiments, the system of FIG. 2 may be used to perform out-of-band authentication such that a user must authenticate to off-host authentication processing system 206 in order to access functionality of IHS 202 that is provided by its host processing system 204. The authentication of a user to access the functionality of IHS 202 is controlled by off-host authentication processing system 206, authentication IHS 220, and/or directory system 222 that operate to verify the user and release a token to host processing system 204 that provides the user access to IHS 202.

Particularly, verification of a user may be performed by authentication IHS 220 such that IHS 202 never stores authentication credentials for any user, while authentication tokens are encrypted and exchanged between off-host authentication processing system 206 and authentication IHS 220 such that authentication IHS 220 can send an approval message to directory system 222 to provide for the release of a token to host processing system 204 that allows a user access to IHS 202 if they have been validated. Because host processing system 204 and off-host authentication processing system 206 need not interact in the out-of-band authentication system, host processing system 204 and off-host authentication processing system 206 may be physically segregated (e.g., there may be no communications bus connecting or directly connecting host processing system 204 and external off-host authentication processing system 206) to prevent any access or compromise of host processing system 204 from enabling an unauthorized user to access functionality of IHS 202.

Figure 3:
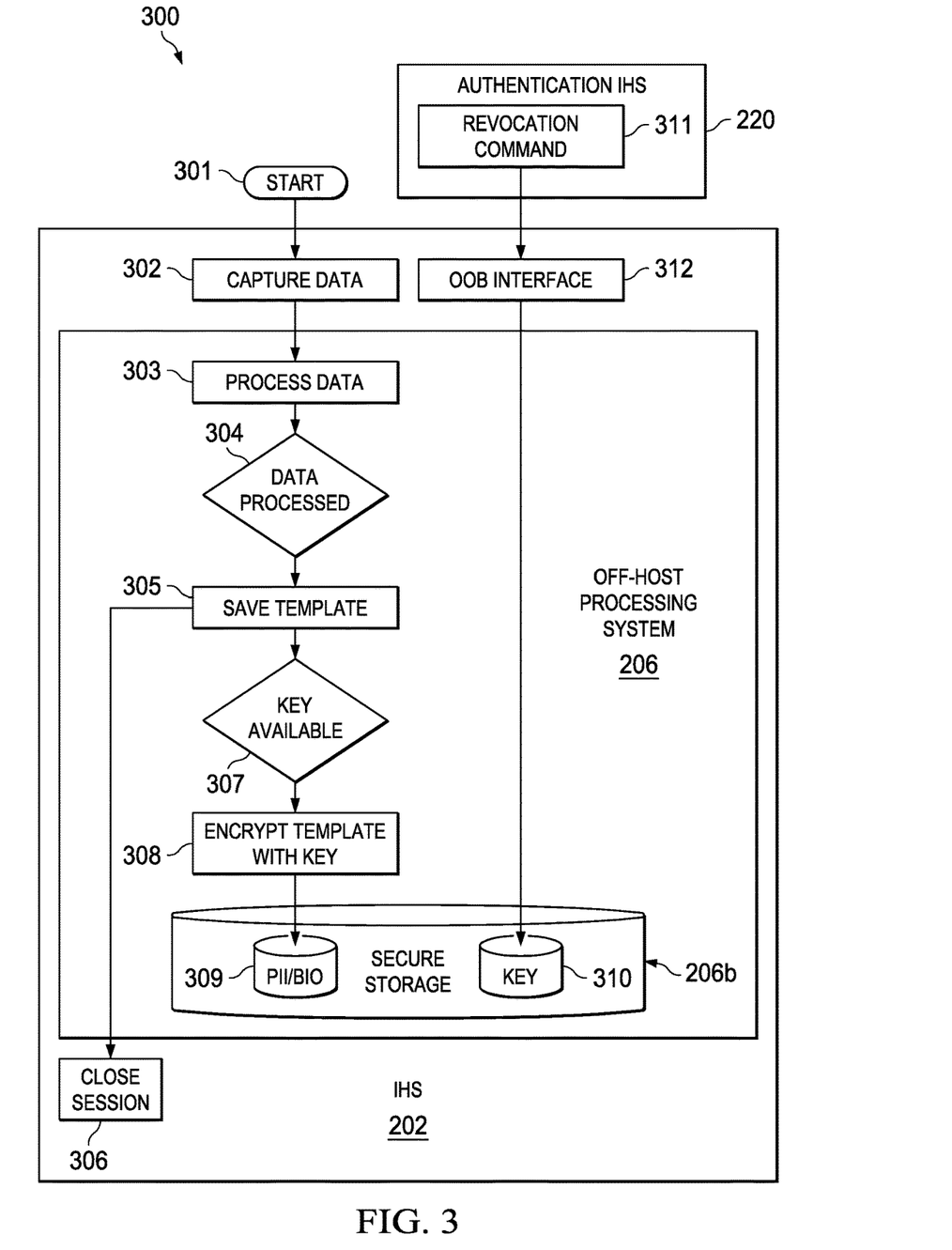
FIG. 3 is a flowchart of an example of a method for fingerprint revocation according to some embodiments.

Turning now to FIG. 3, an example of method 300 for fingerprint revocation is depicted. Prior to the start of method 300, there may be a provisioning operation whereby an IT administrator provides master key 310 to off-host processing system 206 in a secure manner. For example, master key 310 may be stored in off-host memory 206b before IHS 202 is physically handed to the user. Alternatively, a device ID (e.g., a service tag, etc.) and/or user ID may be sent to authentication server 220 over the network, and master key 310 may be returned to IHS 202's off-host processing system 206 (e.g., over a TLS connection).

In the embodiment described in FIG. 3, it is assumed that the provisioning operation has already taken place. For ease of explanation, each operation of method 300 is shown within the entity that is configured to perform that operation, including IHS 202, off-host processing system 206, and authentication IHS 220.

Method 300 starts at block 301. At block 302, IHS 202 begins a biometric enrollment process and captures biometric data provided by the user. The enrollment process may be required for the user's subsequent login into IHS 202 and/or to allow the user to access certain features of IHS 202. Such an enrollment process may take place, for example, when the user is first handed IHS 202 (e.g., new hire, replacement device, etc.).

Alternatively, block 302 may capture any other PII data such, for example, username and password, fingerprint data, facial scan data, iris scan data, voice sample data, smartcard data, magnetic card data, near-field communication (NFC) data, etc.

In some cases, block 302 may be performed by an Operating System (OS) executed by host processing system 204 of IHS 202. In other cases, however, block 302 may be performed by off-host processing system 206.

Blocks 303-308 are performed by off-host processing system 206 in order to provide security that would not otherwise be available if only host processing system 204 were present in IHS 202. Particularly, at block 303, off-host processing system 206 processes the biometric or PII data received at block 302. For example, in the case of a fingerprint or other biometric data, block 303 creates a reference template. Block 304 determines whether the data has been processed. If so, the reference template is saved at block 305, and block 306 closes the enrollment session.

The process of saving the reference template includes determining whether master key 310 is available within off-host memory 206b at block 307. If so, the template is encrypted with master key 310 at block 308, and then stored as PII/Bio data 309 in off-host memory 206b.

It should be noted that, in some cases, PII/Bio data 309 is stored in off-host memory 206b in an encrypted form by default. As such, another key (a "first key" or "container key") may provide an additional level of encryption, wrapping already encrypted information. For example, in some cases, PII/Bio data 309 may be encrypted with master key 310 and then with the first key prior to being stored in off-host memory 206b. In certain cases, the first key may be derivable by EC system 210 (e.g., based upon a measured processor characteristic, a voltage within host processor 204a, a temperature of host processor 204a, and/or a serial number of host processor 204a), whereas master key 310 may not be. Rather, master key 310 may be a symmetric key provided by authentication IHS 220 during the provisioning phase for added security.

At this point, IHS 202 has master key 310 and PII/Bio data 309 stored in off-host memory 206b. After PII/Bio data 309 is encrypted with master key 310, both master key 310 and PII/Bio data 309 may be encrypted with the first or container key.

Later the user may lose IHS 202, may leave his or her employment, may suffer a device malfunction that requires IHS 202 to leave his or her possession, etc. At this point, authentication IHS 220 may send revocation command 311 to off-host processing system 206 through out-of-band interface 312. In some cases, receipt of revocation command 311 may occur in response to off-host processing system 206 transmitting an indication, to authentication server 220, that IHS 202 is connected to the network. Alternatively, transmission of revocation command 311 may be initiated by authentication server 220 in response to authentication server 220's own detection that IHS 202 has a network connection.

Upon receipt of command 311, off-host processing system 206 deletes or invalidates master key 310. With master key 310 now invalidated or deleted from off-host memory 206b, PII/Bio data 309 is no longer retrievable.

It should be noted that, in some situations, master key 310 may be invalidated or deleted even when the user is still allowed to operate IHS 202 and/or IHS 202 is functional.

For example, authentication server 220 may revoke master key 310 in the event that PII Bio data 309 is compromised through detecting tampering through software or physically. In those cases, the user may be reissued a new master key and may re-enroll.

Because key revocation command 311 is transmitted to IHS 202 through an out-of-band channel, it bypasses host processing system 204 and therefore is not subject to OS vulnerabilities. As shown in FIG. 2, off-host processor 206a has access to secondary network controller 214b, which is segregated from primary network controller 214a coupled to host processor 204a.

In some implementations, revocation command 311 may be generalized into a key management command, which includes a revocation command or a renewal command, configured to change a status of master key 311 and therefore make it dynamic. For instance, in some cases master key 311 may have an expiration time or date. If the expiration is reached, master key 311 may be automatically invalidated or deleted by off-host processing system 206.

In these cases, master key 311's expiration may be reset by a renewal command issued by authentication server 311. Such a command may be sent to IHS 202 at regular intervals, immediately before the expiration of master key 311, or each time HS 202 has a network connection. As such, if the user loses IHS 202 or leaves his or her employment, authentication IHS 220 may then stop sending the renewal command to IHS 202, thus allowing master key 311 to expire.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
identify an endpoint device; and
transmit a key management command to the endpoint device over a network, wherein the endpoint device includes a host processing system and an off-host processing system segregated from the host processing system, wherein the off-host processing system includes an off-host processor and an off-host memory coupled to the off-host processor, wherein the off-host memory includes Personal Identifiable Information (PII) encrypted with a master key, and wherein the off-host processor is configured to change a status of the master key in response to having received the key management command, wherein the endpoint device further includes an embedded controller coupled to the off-host processing system, wherein the encrypted PII and the master key are encrypted with the first key prior to being stored in the off-host memory, wherein the first key is derivable by the embedded controller based upon a measurement of a host processor of the endpoint device, and wherein the master key is not derivable by the embedded controller.

2. The IHS of claim 1, wherein identifying the endpoint device includes receiving an indication, from the endpoint device, that the endpoint device is connected to the network.

3. The IHS of claim 1, wherein the key management command includes a revocation command, and wherein the off-host processor is configured to delete or invalidate the master key in response to having received the revocation command.

4. The IHS of claim 1, wherein the master key has an expiration, wherein the key management command includes a renewal command, and wherein the off-host processor is configured to reset the expiration in response to having received the renewal command.

5. The IHS of claim 1, wherein the PII includes at least one of: username and password, fingerprint data, facial scan data, iris scan data, voice sample data, smartcard data, magnetic card data, or near-field communication (NFC) data.

6. The IHS of claim 1, wherein the key management command is transmitted to the endpoint device through an out-of-band channel bypassing the host processing system.

7. The IHS of claim 6, wherein the off-host processor has access to a secondary network controller segregated from a primary network controller coupled to the host processor.

8. The IHS of claim 1, wherein the first key is derivable by the embedded controller based upon a measurement of the host processor's voltage or temperature.

9. An off-host processing system coupled to an Information Handling System (IHS), the off-host processing system segregated from a host processing system, the off-host processing system having an off-host processor and an off-host memory, the off-host memory having program instructions stored thereon that, upon execution by the off-host processor, cause the off-host processor to:
   store a master key in the off-host memory;
   receive fingerprint information from a user;
   encrypt the fingerprint information with the master key;
   encrypt the encrypted fingerprint information and the master key with another key derivable by an embedded controller of the IHS based upon a measurement of a host processor of the host processing system;
   store the re-encrypted fingerprint information and the encrypted master key in the off-host memory;
   receive a key management command over a network; and
   change a status of the master key in response to the key management command.

10. The off-host processing system of claim 9, wherein receiving the key management command occurs in response to transmitting an indication, to an authentication server, that the IHS is connected to the network.

11. The off-host processing system of claim 9, wherein the key management command includes a revocation command, and wherein the off-host processor is configured to delete or invalidate the master key in response to having received the revocation command.

12. The off-host processing system of claim 9, wherein the master key has an expiration, wherein the key management command includes a renewal command, and wherein the off-host processor is configured to reset the expiration in response to having received the renewal command.

13. The off-host processing system of claim 9, wherein the key management command is received by the IHS through an out-of-band channel bypassing the host processing system.

14. The off-host processing system of claim 13, wherein the off-host processor has access to a secondary network controller segregated from a primary network controller coupled to the host processor.

15. The off-host processing system of claim 9, wherein the other key is derivable by the embedded controller based upon a measurement of the host processor's voltage or temperature.

16. In an Information Handling System (IHS) having an off-host processing system, the off-host processing system segregated from a host processing system, the off-host processing system having an off-host processor and an off-host memory, a method performed by the off-host processor, the method comprising:
   receiving a key management command over a network; and
   changing a status of a master key in response to the key management command, wherein the master key is stored in the off-host memory, wherein the master key is used by the off-host processor to encrypt fingerprint information stored in the off-host memory, wherein the IHS further comprises an embedded controller coupled to the off-host processing system, wherein the encrypted fingerprint information and the master key are encrypted with another key prior to being stored in the off-host memory, wherein the other key is derivable by the embedded controller based upon a measurement of a host processor of the host processing system, and wherein the master key is not derivable by the embedded controller.

17. The method of claim 16, wherein the key management command includes a revocation command, and wherein the off-host processor is configured to delete or invalidate the master key in response to having received the revocation command.

18. The method of claim 16, wherein the master key has an expiration, wherein the key management command includes a renewal command, and wherein the off-host processor is configured to reset the expiration in response to having received the renewal command.

19. The method of claim 16, wherein the key revocation command is received by the off-host processor through a secondary network controller segregated from a primary network controller coupled to the host processor.

20. The method of claim 16, wherein the other key is derivable by the embedded controller based upon a measurement of the host processor's voltage or temperature.

* * * * *